United States Patent
Graessley

(10) Patent No.: US 9,439,234 B2
(45) Date of Patent: Sep. 6, 2016

(54) SYSTEM AND METHOD FOR INTELLIGENTLY SELECTING A NETWORK INTERFACE

(71) Applicant: Apple Inc., Cupertino, CA (US)

(72) Inventor: Joshua V Graessley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 373 days.

(21) Appl. No.: 13/719,927

(22) Filed: Dec. 19, 2012

(65) Prior Publication Data

US 2014/0171065 A1 Jun. 19, 2014

(51) Int. Cl.
| | |
|---|---|
| H04W 4/00 | (2009.01) |
| H04W 76/02 | (2009.01) |
| H04W 72/08 | (2009.01) |
| H04W 74/08 | (2009.01) |
| H04W 48/18 | (2009.01) |
| H04W 88/06 | (2009.01) |

(52) U.S. Cl.
CPC ......... *H04W 76/027* (2013.01); *H04W 76/028* (2013.01); *H04W 48/18* (2013.01); *H04W 72/085* (2013.01); *H04W 74/0875* (2013.01); *H04W 88/06* (2013.01)

(58) Field of Classification Search
CPC . H04W 88/06; H04W 48/18; H04W 76/028; H04W 72/085; H04W 74/0875
USPC ............. 455/434–435.3, 550.1, 552.1, 553.1
See application file for complete search history.

(56) References Cited

U.S. PATENT DOCUMENTS

| | | | |
|---|---|---|---|
| 2005/0003822 A1 | | 1/2005 | Aholainen et al. |
| 2005/0060425 A1 | | 3/2005 | Yeh et al. |
| 2006/0045069 A1 | | 3/2006 | Zehavi et al. |
| 2008/0108348 A1 | | 5/2008 | Kottilingal et al. |
| 2008/0275992 A1 | | 11/2008 | Basty et al. |
| 2009/0006635 A1 | | 1/2009 | Siegmund |
| 2010/0329218 A1 | * | 12/2010 | Hoshino ................. 370/335 |
| 2011/0286321 A1 | | 11/2011 | Sureshchandran |
| 2013/0044603 A1 | * | 2/2013 | Macias et al. ........... 370/241 |
| 2013/0083772 A1 | * | 4/2013 | Hata ........................ 370/331 |
| 2013/0215740 A1 | * | 8/2013 | Tse et al. ................. 370/228 |

OTHER PUBLICATIONS

International Search Report directed to related International Patent Application No. PCT/US2013/066195, mailed Dec. 13, 2013; 4 pages.
International Preliminary Report on Patentability and Written Opinion of the International Searching Authority directed to related International Patent Application No. PCT/US2013/066195, issued Jun. 23, 2015; 7 pages.

* cited by examiner

*Primary Examiner* — Charles Appiah
*Assistant Examiner* — Jaime Holliday
(74) *Attorney, Agent, or Firm* — Sterne, Kessler, Goldstein & Fox P.L.L.C.

(57) ABSTRACT

An method, apparatus and machine readable medium are described for intelligently selecting a network interface. An attempt may be made to connect over a first network interface having the highest priority (e.g., WiFi). At the same time, a fallback timer is started. If the attempt to connect over the first network interface does not succeed within a designated timer threshold, then a parallel attempt is made to connect over a second network interface having a lower priority (e.g., cellular). The first network interface over which a connection is successfully made is then used. These techniques may be employed on a per-connection basis. Thus, a first process may successfully connect over the first network interface while a second process may be unsuccessful over the first network interface but may fall back to the second network interface.

26 Claims, 8 Drawing Sheets

SYSTEM AND METHOD FOR INTELLIGENTLY SELECTING A NETWORK INTERFACE

BACKGROUND

1. Technical Field

The subject matter described herein relates generally to the field of data processing systems. More particularly, the subject matter described herein relates to the intelligent selection of network interfaces for communication.

2. Description of Related Art

Current wireless data processing devices are capable of connecting to network services through multiple different communication interfaces including Wifi interfaces (e.g., 802.11 interfaces) and cellular data interfaces (e.g., GPRS, G3, G4 interfaces). FIG. 1, for example, illustrates a wireless client 101 with a Wifi interface 102 for connecting to a network service 110 over a Wifi network 105 and a cellular interface 103 for connecting to a push notification service 110 over the cellular network 106.

BRIEF DESCRIPTION OF THE DRAWINGS

A better understanding of the subject matter described herein can be obtained from the following detailed description in conjunction with the following drawings, in which.

DETAILED DESCRIPTION

Described below are apparatus, methods, and machine-readable media for intelligently selecting a network interface. Throughout the description, for the purposes of explanation, numerous specific details are set forth. It will be apparent, however, to one skilled in the art that the subject matter described herein may be practiced without some of these specific details. In other instances, well-known structures and devices are not shown or are shown in a block diagram form to avoid obscuring the underlying principles of the described subject matter.

A mobile device is described below such as a tablet computing device (e.g., an iPad), a smartphone (e.g., a iPhone), or a mobile computer (e.g., a MacBook Pro). It should be noted that the underlying techniques described herein may be implemented on any type of mobile computing device.

Using the techniques described herein, a mobile device that is associated to a WiFi network and has access to a cellular data connection will attempt to fall back to the cellular data connection for any connection attempts that do not work over WiFi. For example, WiFi networks typically utilize a firewall which may block access to certain services or applications executed on the mobile device. In other cases, the WiFi network may not be attached to the Internet (e.g., because the user's cable modem or DSL connection stopped working).

Figure 1:
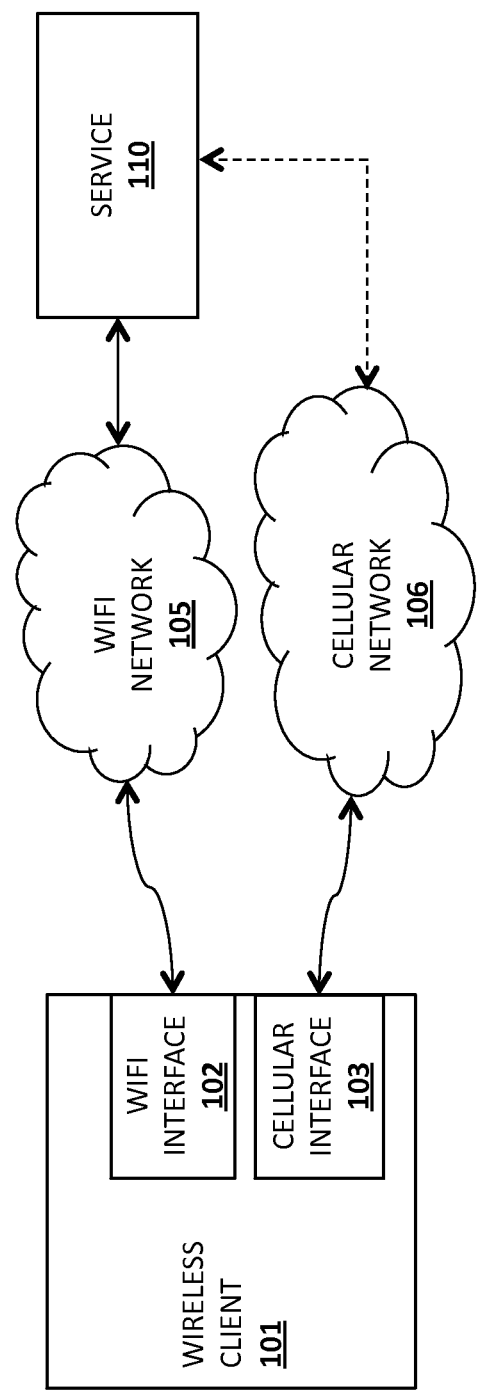
FIG. 1 illustrates a prior art wireless client connecting to a push notification service over a Wifi network and a cellular network.
Figure 2:
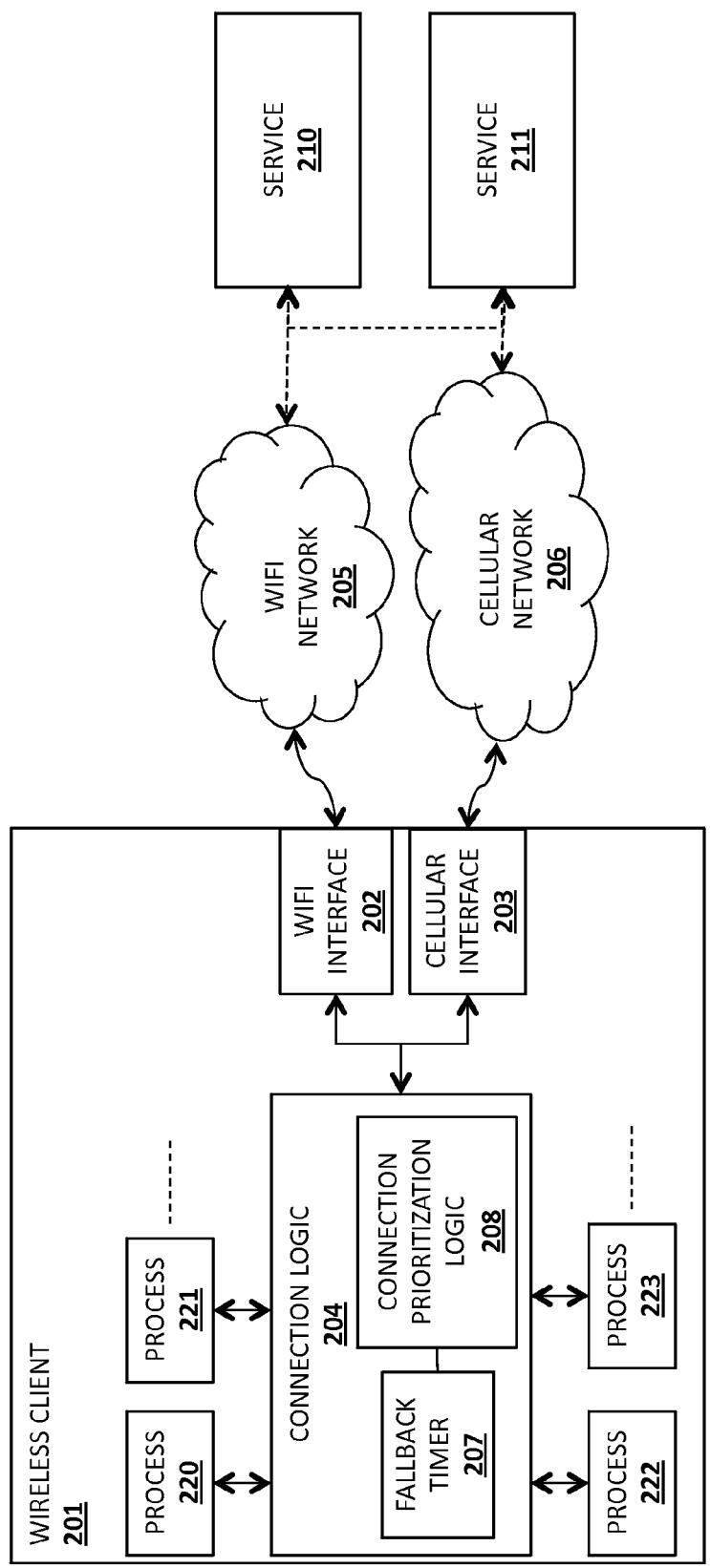
FIG. 2 illustrates an exemplary wireless client for intelligently selecting either a Wifi network interface or a cellular network interface.

A wireless client may attempt a connection over a cellular network interface after waiting a reasonable amount of time for a connection over the WiFi network interface to succeed. As illustrated in FIG. 2, a wireless client 201 may include connection logic 204 for implementing the techniques described herein to select between a Wifi interface 202 and a cellular interface 203 and establish a connection with a particular network service 210-211. As illustrated, the WiFi interface 202 may connect the wireless client 201 over a Wifi network 205 and the cellular interface 203 may connect the wireless client 201 over a cellular network 206. For cellular connections, various technologies may be employed including, but not limited to: 3rd Generation Partnership Project technologies (e.g., 3GPP2) code division multiple access technologies (e.g., CDMA2000 technology using 1×RTT/EVDO/eHRPD); Long Term Evolution (LTE) technology and/or LTE-Advanced (LTE-A) technology; and Universal Mobile Telecommunications System (UMTS) technology such as WCDMA/TDSCDMA.

The connection logic 204 includes connection prioritization logic 208 for prioritizing the network interfaces 202-203 and a fallback timer 207 for timing connection attempts. In response to a network request by one of the processes 220-223, the connection logic 202 attempts to connect to the designated service 210 or 211 over the highest-priority network interface which is available (e.g., the WiFi interface 202). The fallback timer 207 begins timing the connection attempt. If a connection is not successfully established via the highest priority network interface 202 after a specified period of time (e.g., 5 seconds), then the connection logic 204 initiates a parallel connection attempt over the next-highest priority network interface (e.g., the cellular interface 203). The connection logic 204 may then use the first connection which is successfully established over one of the interfaces 202-203.

The techniques described herein may be implemented on a per-connection basis. For example, one process 220 may successfully connect to a service over WiFi 202 whereas another process 220 may be unable to connect over WiFi 202 but may successfully connect over cellular 203 using the techniques described herein. The failure to connect over WiFi may be related to the manner in which the WiFi firewall is configured. For example, the firewall may be configured to block certain types of traffic (e.g., streaming video from certain network sources). The processes 220-223 may be any form of executable program code capable of requesting and maintaining a network connection (e.g., network processes within Apps, Applications, background tasks or other forms of program code).

Figure 3:
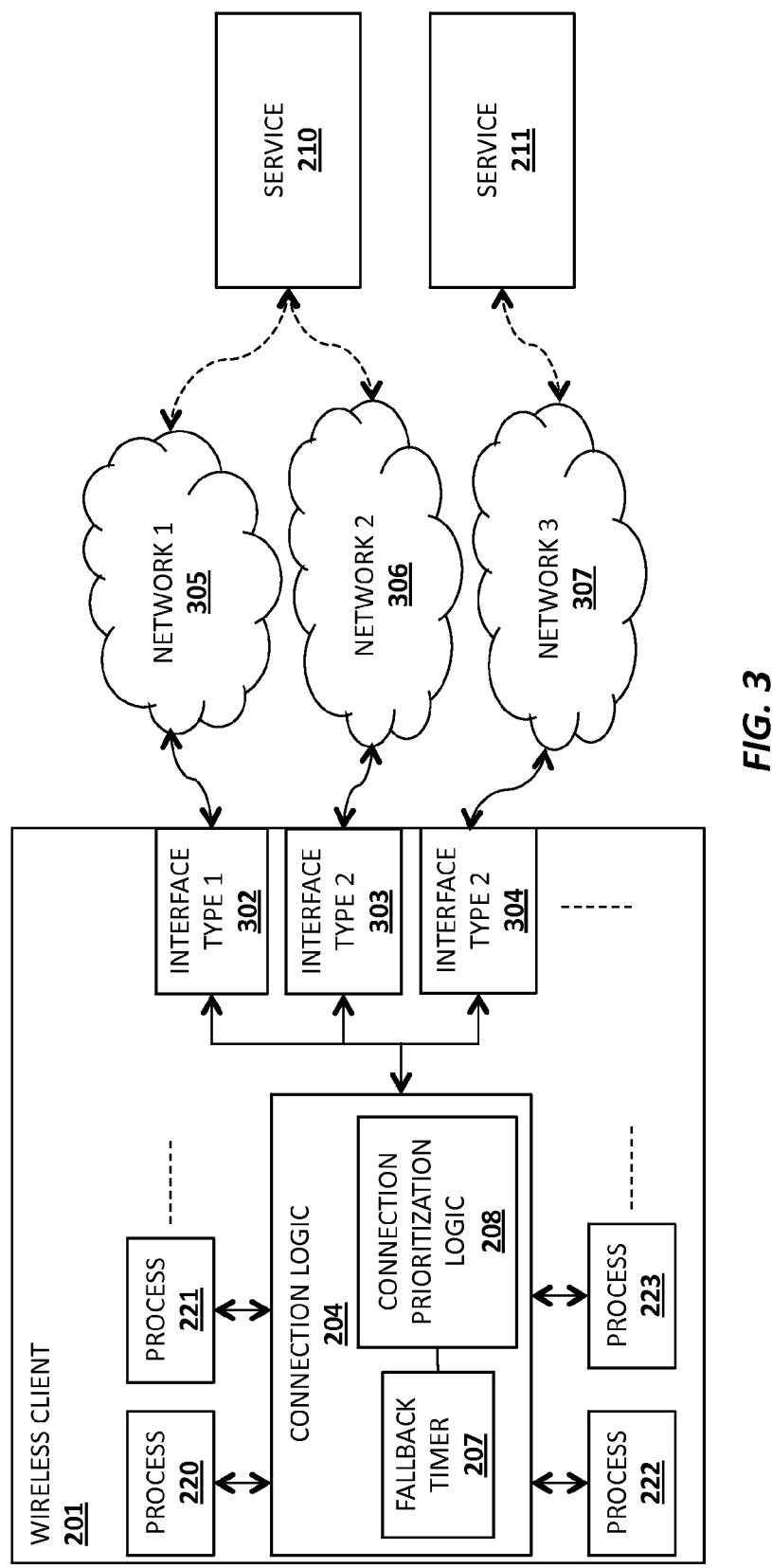
FIG. 3 illustrates an exemplary wireless client for intelligently selecting between a variety of different network interfaces.

FIG. 3 illustrates three different interface types 302-304 which represent any number of network interfaces for communicating over networks 305-307 including, but not limited to Ethernet, Bluetooth, WiMAX, tethered cellular interfaces, WiFi, and cellular, to name a few. As new interfaces are developed, the underlying techniques described herein may be used with these interfaces. The prioritization logic 208 may specify a prioritization scheme for each of the network interfaces 302-304 (regardless of interface type) which may then be utilized by the connection logic 204 when initiating connections. The prioritization scheme may be specified on a per-process basis. For example, some processes 220-223 and/or services 210-211 may prefer to connect over network interface 302 while other processes/services may prefer to connect over network interface 303.

The fallback timer 207 may dynamically adjust the timer threshold for a second connection attempt based on current conditions. For example, the fallback timer 207 may initially set a "slow" timer value (e.g., 5 seconds). If the connection over the highest priority network interface (e.g., WiFi) is unsuccessful and the connection logic 204 is able to successfully fall back to the next-highest priority network interface (e.g., cellular), then the fallback timer may adjust to a "fast" timer value, to be used the next time a connection over the highest priority network interface is attempted. The same timer values may be established and used across processes/services. The timer values may also be set on a per-process/interface or per-service/interface basis.

The connection logic 204 may balance the need to try any method of establishing a connection against the power and money costs of using some or all network interfaces 302-304. Certain types of connections, certain processes, and/or certain services may be designated as ineligible for fallback (e.g., fallback from WiFi to cellular been disabled for these connections, processes, or services). A user may also be provided with the ability to configure the connection logic 204 to prevent connections by certain processes/services over certain network interfaces. For example, the user may specify that any processes which perform media streaming are not to be used over the cellular interface (e.g., to reduce cellular data costs and/or reduce power). In addition, certain processes 220-223 may be pre-configured to only utilize certain interfaces 302-304.

A given process may be eligible for fallback to cellular unless certain specified conditions are met; for example: (1) fallback has not been disabled; (2) the connection would go out over WiFi; (3) the connection won't be routed over a VPN; (4) the client didn't opt-out of fallback (as with certain known processes such as mediaserverd); (5) the client didn't bind to a specific interface; (6) the client didn't specify a "no-cellular" option; and (7) cellular is available. If all of these conditions are met, the fallback timer may be started at the same time the connection attempt is started over WiFi. If the connection attempt over WiFi does not succeed or fail within the designed timer period, a parallel connection attempt is started over cellular. At that point, whichever connection attempt completes first 'wins' and the other attempt is cancelled.

The "fast" timer value may be tuned based on the measured Round Trip Time (RTT) over WiFi and the RTT over cellular. The goal is to make sure the RTT over WiFi is always some amount of time (e.g., 50 milliseconds) less than the RTT over cellular+the fast fallback timer. Given the fact that cellular typically has a much longer round trip time, the fast fallback timer may be 0, meaning that both WiFi and cellular will be attempted simultaneously with the "fast" timer value.

As mentioned, if a fallback connection succeeds before the original attempt over WiFi, a switch may be made to the fast timer if it wasn't already being used. If an original attempt over WiFi succeeds, the connection logic 204 may switch back to the "slow" timer value if it wasn't already being used. The fast/slow timer state may be stored on a per-process basis (i.e., each process 220-223 has either a "fast" or "slow" timer value associated therewith).

In some instances, the above techniques may have the benefit of improving the user experience because if the WiFi network is not providing internet connectivity, a process may experience an approximate 5 second delay for the first connection attempt (using the "slow" timer), but all subsequent connection attempts would be just about as fast as cellular (using the "fast" timer). WiFi may always be given the first opportunity to connect (assuming that a WiFi connection is feasible).

Once a transmission control protocol (TCP) connection is established, it may (in some instances) not switch back to a different interface. One reason for this is that, in many TCP implementations, a TCP connection cannot migrate from one interface to another (i.e., because TCP connections are bound by the source and destination IP addresses and ports). Subsequent connections may still fall back on a per-connection basis. Thus, anything that works over WiFi will tend to use WiFi and anything else will use cellular.

The cellular data connection may only be used when the device has access to cellular data. When in a roaming condition and/or if the user has disabled cellular data roaming or when in "AirPlane" mode or if the user disabled cellular data, cellular fallback will be disabled.

Figure 4:
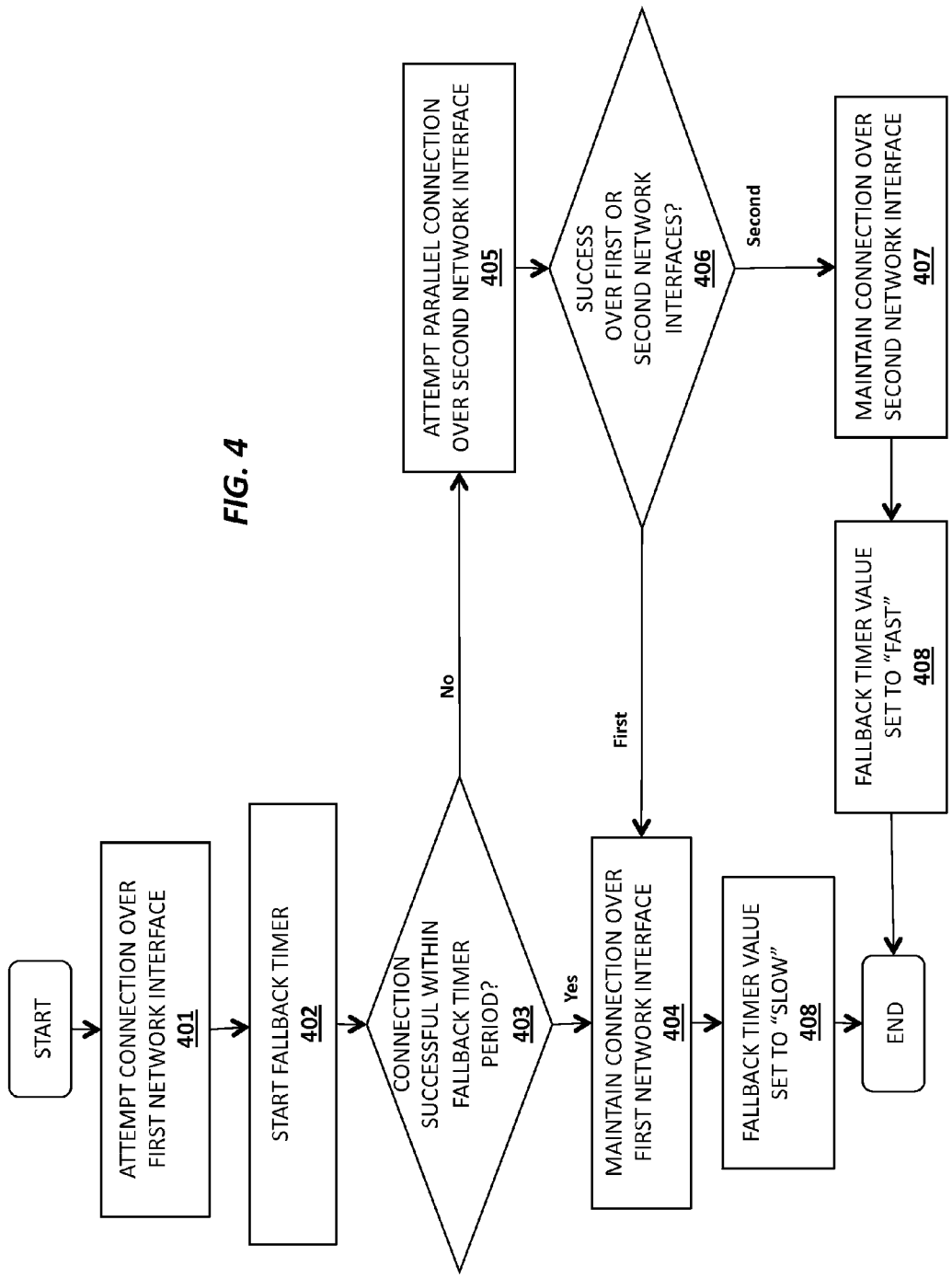
FIG. 4 illustrates an exemplary method for selecting between network interfaces.

A method for falling back to a network interface is illustrated in FIG. 4. At 401, an attempt is made to establish a network connection over a first network interface (e.g., WiFi). As discussed above, the network interfaces may be prioritized and the first network interface is the highest priority of the available network interfaces. The fallback timer is started at 402 and, at 403, a determination is made as to whether a connection over the first network interface has been established within the designated fallback timer period. If so, then at 404 the connection is maintained over the first network interface and, at 408, the fallback timer is set or maintained at the "slow" timer value (e.g., 5 seconds).

If a connection over the first network interface has not been established within the designated fallback timer period, then at 405 a parallel attempt is made to connect over the second network interface (e.g., cellular). At 406 a determination is made as to whether a connection has been successfully established over the first or second network interfaces. If the first, then the connection is maintained over the first network interface at 404 and, at 408, the fallback timer is set or maintained at the "slow" timer value. If, however, a connection is first established over the second network interface then, at 407, the connection over the second network interface is maintained and, at 408, the fallback timer is set or maintained at the "fast" timer value.

While not shown in FIG. 4, the wireless client device may attempt to fall back to a third network interface if a connection over the first and second network interfaces is unsuccessful. For example, if both the first and second interfaces fail to establish a connection after another specified timer value, then a parallel attempt may be made over a third network interface. The number of connection attempts is limited only by the number of interfaces available on the wireless client device. Thus, the connection logic 204 may iterate through each network interface until a connection is successful.

The mobile device may determine whether it is connected to a host that simply redirects its connection attempt to a different location (e.g., in the case of HTTP redirection). Some networks (sometimes referred to as "captive portals") do not permit connections on the network until the user authenticates or accepts terms. These networks will intercept an HTTP connection attempt and redirect it to a special Web page containing the authentication portal or terms. The cellular fallback techniques described above may be used for cases where a connection attempt is redirected to a portal.

For example, upon detecting the redirection, the mobile device will initiate a connection over the cellular interface. Said another way, the definition of a "successful" connection is determined by the ability to access the desired resource, not just establish a network connection.

While certain techniques are described above within the context of two specific communication channels, Wifi and cellular, the underlying principles are not limited to any particular type of communication channel. For example, the techniques described herein may be employed on any client device with multiple communication interfaces capable of connecting over multiple different types of communication channels. For example, these techniques may be implemented to connect over a first communication interface and then fall back to a second communication interface if the connection over the first interface is unsuccessful after a period of time.

Different Exemplary API's

Different application programming interfaces (APIs) may be implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component 2010 and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

Figure 5:
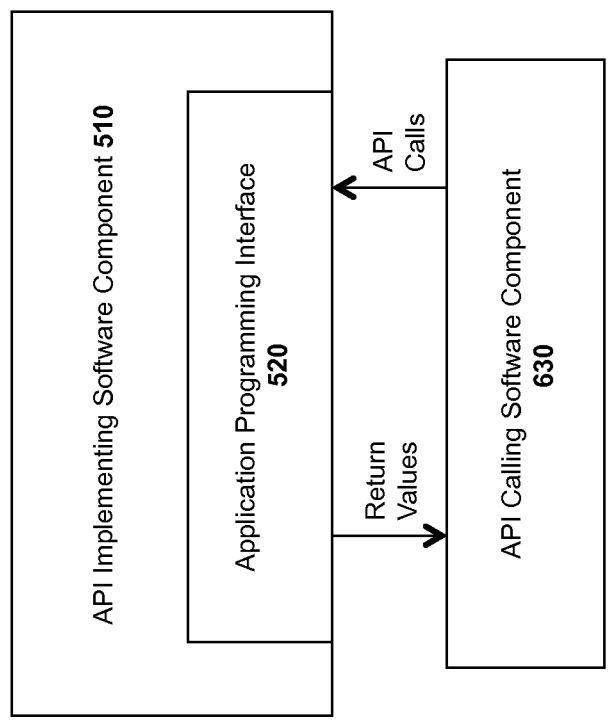
FIG. 5 illustrates an application programming interface which may be used on a wireless client device.

FIG. 5 illustrates one API architecture which includes an API implementing software component 510 (e.g., an operating system, a library, a device driver, an API, an application program, or other software module) that implements the API 520. The API 520 specifies one or more functions, methods, classes, objects, protocols, data structures, formats and/or other features of the API implementing software component that may be used by the API calling software component 530. The API 520 can specify at least one calling convention that specifies how a function in the API implementing software component receives parameters from the API calling software component and how the function returns a result to the API calling software component. The API calling software component 530 (e.g., an operating system, a library, a device driver, an API, an application program, or other software module), makes API calls through the API 520 to access and use the features of the API implementing software component 510 that are specified by the API 520. The API implementing software component 510 may return a value through the API 520 to the API calling software component 530 in response to an API call.

It will be appreciated that the API implementing software component 510 may include additional functions, methods, classes, data structures, and/or other features that are not specified through the API 520 and are not available to the API calling software component 530. It should be understood that the API calling software component 530 may be on the same system as the API implementing software component 510 or may be located remotely and accesses the API implementing software component 510 using the API 520 over a network. While FIG. 5 illustrates a single API calling software component 530 interacting with the API 520, it should be understood that other API calling software components, which may be written in different languages (or the same language) than the API calling software component 530, may use the API 520.

The API implementing software component 510, the API 520, and the API calling software component 530 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 6:
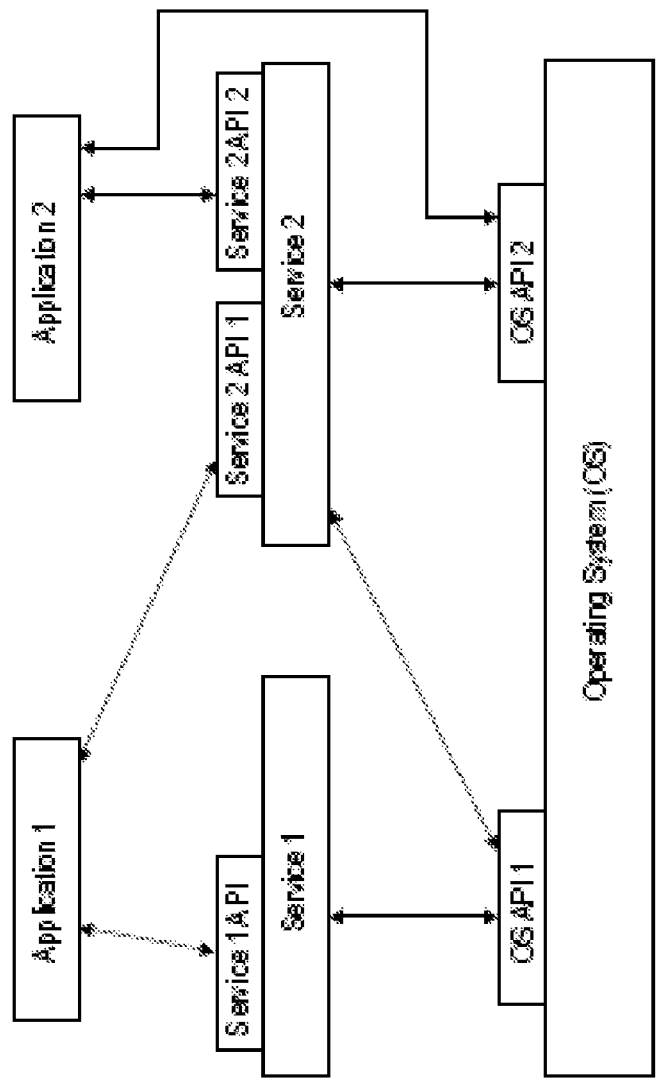
FIG. 6 illustrates exemplary applications interfacing to services and operating systems.

In FIG. 6 ("Software Stack"), applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Exemplary Data Processing Devices

Figure 7:
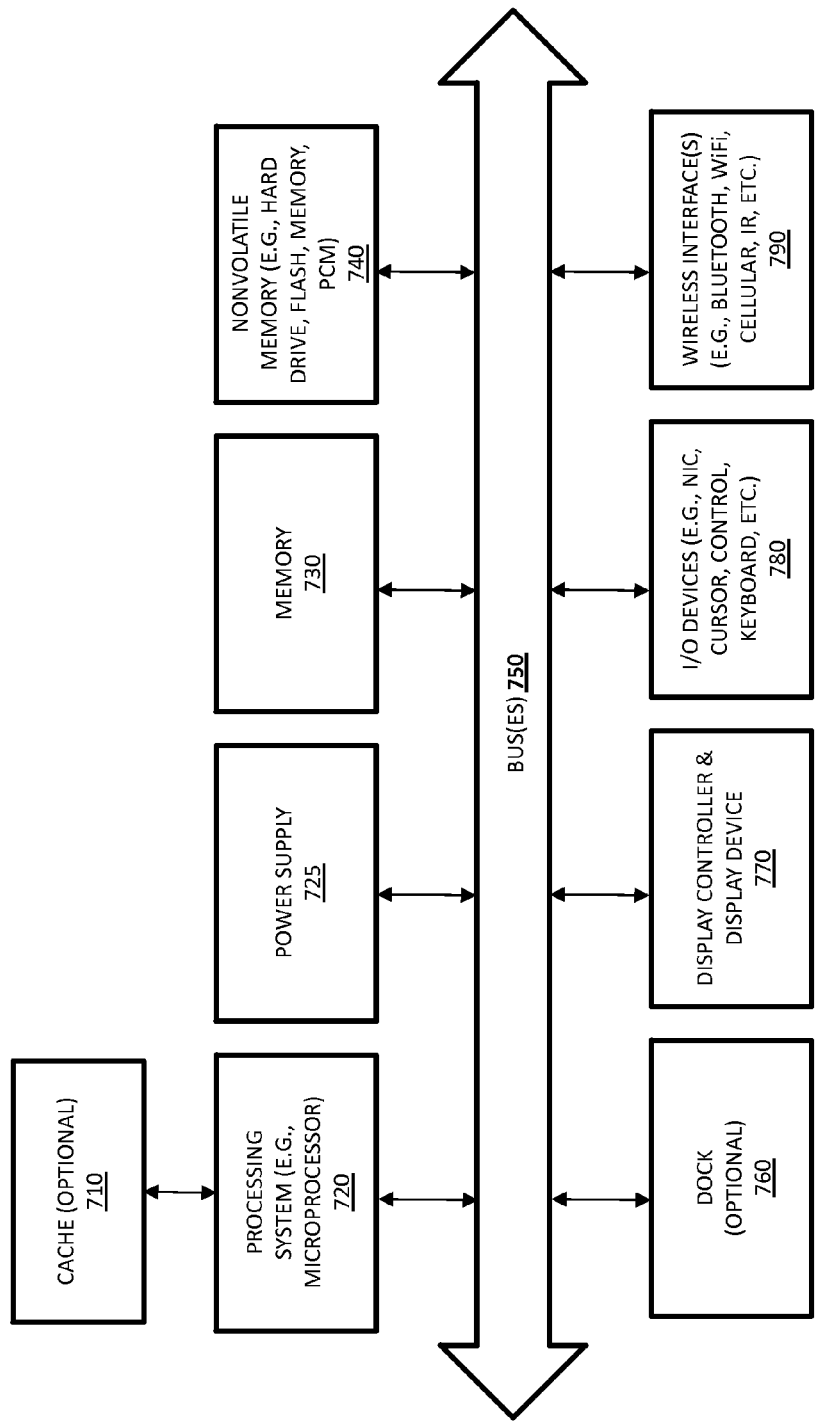
FIG. 7 illustrates an exemplary architecture of a data processing device.

FIG. 7 is a block diagram illustrating an exemplary computer system which may be used. It should be understood that while FIG. 7 illustrates various components of a computer system, it is not intended to represent any particular architecture or manner of interconnecting the components as such details are not germane to the techniques described herein. It will be appreciated that other computer systems that have fewer components or more components may also be used with the present techniques.

As illustrated in FIG. 7, the computer system 700, which is a form of a data processing system, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations as described above. The bus 750 interconnects the above components together and also interconnects those components to the optional dock 760, the display controller & display device 770, Input/Output devices 780 (e.g., an Ethernet Network Interface), a cursor control (e.g., mouse, touchscreen, touchpad, etc.), a keyboard, etc.), and wireless interface(s) 790 (e.g., Bluetooth, WiFi 202, cellular 203, infrared, etc.).

Figure 8:
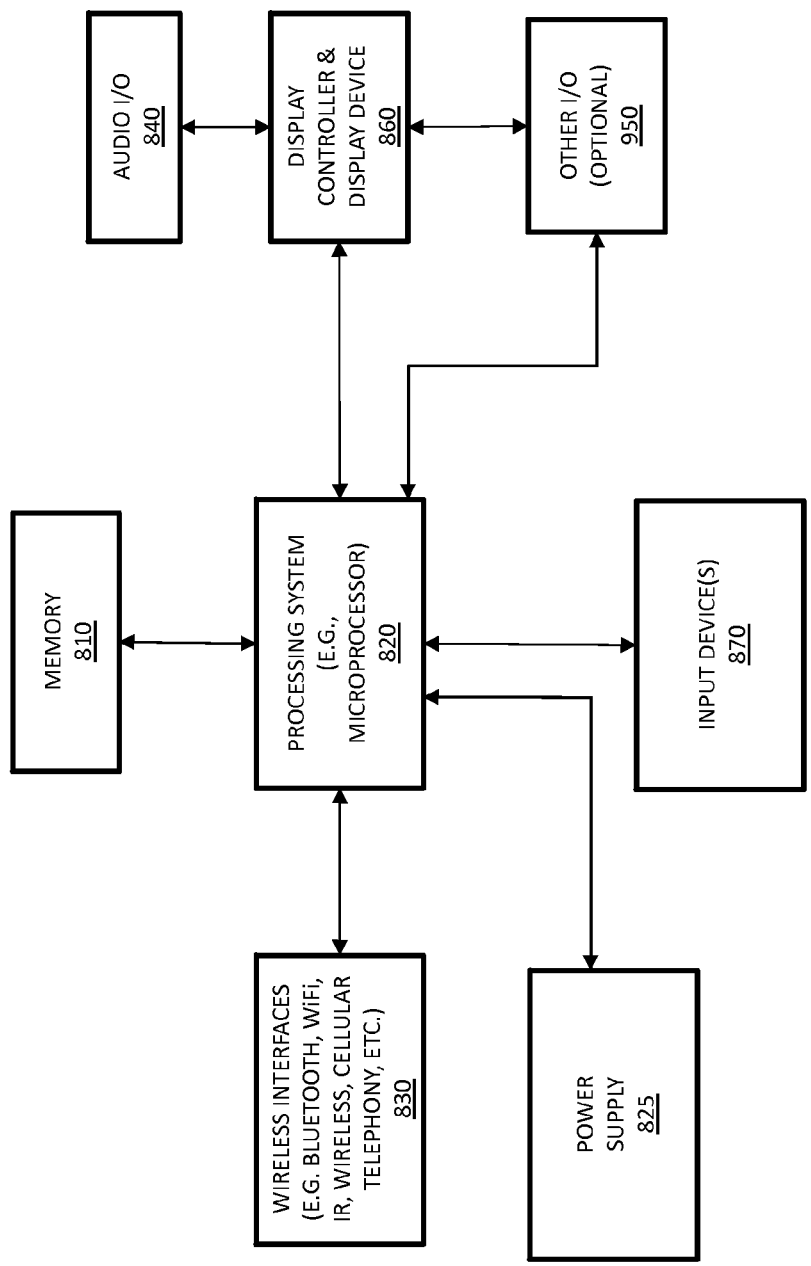
FIG. 8 illustrates another architecture of a data processing device.

FIG. 8 is a block diagram illustrating an exemplary data processing system on which the techniques described herein may be implemented. For example, the data processing system 800 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 800 may be a network computer or an embedded processing device within another device.

The exemplary architecture of the data processing system 800 may used for the mobile devices described above. The data processing system 800 includes the processing system 820, which may include one or more microprocessors and/or a system on an integrated circuit. The processing system 820 is coupled with a memory 810, a power supply 825 (which includes one or more batteries) an audio input/output 840, a display controller and display device 860, optional input/output 850, input device(s) 870, and wireless interface(s) 830 (e.g., such as the WiFi 202 and cellular 203 interfaces discussed above). It will be appreciated that additional components, not shown in FIG. 8, may also be a part of the data processing system 800 and that fewer components than shown in FIG. 8 may be used. In addition, it will be appreciated that one or more buses, not shown in FIG. 8, may be used to interconnect the various components as is well known in the art.

The memory 810 may store data and/or programs for execution by the data processing system 800. The audio input/output 840 may include a microphone and/or a speaker to, for example, play music and/or provide telephony functionality through the speaker and microphone. The display controller and display device 860 may include a graphical user interface (GUI). The wireless (e.g., RF) interfaces 830 (which may include, e.g., wireless transceivers and/or baseband processing components for communicating data using WiFi technology, infrared technology, Bluetooth technology, wireless cellular telephony technology, and/or other types of technology) may be used to communicate with other data processing systems. The one or more input devices 870 allow a user to provide input to the system. These input devices may be a keypad, keyboard, touch panel, multi touch panel, etc. The optional other input/output 850 may be a connector for a dock.

The features described herein may be implemented according to the various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

The features described herein may also be implemented as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

I claim:

1. A method implemented on a network client that includes two or more network interfaces, wherein the two or more network interfaces include a first network interface that is a WiFi interface and a second network interface that is a cellular interface, wherein the method comprises:
    the network client prioritizing the two or more network interfaces;

the network client initially attempting a connection over the first network interface, the first network interface having a relatively higher priority than the second network interface;

the network client starting a fallback timer substantially concurrently with attempting the connection over the first network interface;

the network client attempting, if the fallback timer has reached a first specified timer threshold prior to a successful connection being established over the first network interface, a connection over the second network interface in parallel with the attempt to connect over the first network interface, wherein the attempting the connection over the first and second network interfaces includes attempting to establish a transmission control protocol (TCP) connection using the first and second network interfaces, respectively; and the network client using the first one of the first and second network interfaces over which a connection is successfully established to communicate data.

2. The method as in claim 1 further comprising:
adjusting the specified timer threshold to a second specified timer threshold in response to connecting over the second network interface.

3. The method as in claim 2 further comprising:
re-adjusting the specified timer threshold back to the first specified timer threshold in response to connecting over the first network interface.

4. The method as in claim 1 wherein the two or more network interfaces include a third network interface, and wherein if the fallback timer has reached a second specified timer threshold prior to a successful connection being established over the first and second network interfaces, then attempting a connection over the third network interface; and
using the first one of the first, second, and third network interfaces over which a connection is successfully established to communicate data.

5. The method as in claim 1 further comprising:
receiving input from a user; and
prioritizing the two or more network interfaces based on the input received from the user.

6. The method as in claim 1 wherein the prioritization of the network interfaces is performed per-process wherein each network process is associated with a separate set of network interface prioritizations.

7. The method as in claim 1 wherein the second network interface will not be used if a particular process is designed to use only the first network interface.

8. The method as in claim 1 further comprising:
determining if the connection will be routed over a virtual private network (VPN); and
using the second network interface only if the connection is not to be routed over a VPN.

9. The method as in claim 1 further comprising:
determining if a process for which a connection is desired has a binding to a particular network interface other than the second user interface; and
attempting to use the second network interface only if the process did not bind to the first network interface.

10. The method as in claim 1 wherein a successful connection is defined as the ability to access a desired resource.

11. The method as in claim 1 wherein the connection attempt over the first or second network interface is unsuccessful when the connection attempt is redirected to a captive portal.

12. A non-transitory machine-readable medium having program code stored thereon which, when executed by a machine, causes the machine to perform the operations of:
prioritizing two or more network interfaces, the two or more network interfaces including a first network interface and a second network interface;
initially attempting a connection over the first network interface, the first network interface having a relatively higher priority than the second network interface;
starting a fallback timer substantially concurrently with attempting the connection over the first network interface;
wherein if the fallback timer has reached a first specified timer threshold prior to a successful connection being established over the first network interface, then attempting a connection over the second network interface in parallel with the attempt to connect over the first network interface, wherein the attempting the connection over the first and second network interfaces includes attempting to establish a transmission control protocol (TCP) connection using the first and second network interfaces, respectively; and
using the first one of the first and second network interfaces over which a connection is successfully established to communicate data.

13. The machine-readable medium as in claim 12 comprising additional program code to cause the machine to perform the operations of:
adjusting the specified timer threshold to a second specified timer threshold in response to connecting over the second network interface.

14. The machine-readable medium as in claim 13 comprising additional program code to cause the machine to perform the operations of:
re-adjusting the specified timer threshold back to the first specified timer threshold in response to connecting over the first network interface.

15. The machine-readable medium as in claim 12 wherein the first network interface comprises a WiFi interface and the second network interface comprises a cellular interface.

16. The machine-readable medium as in claim 12 wherein the two or more network interfaces include a third network interface, and wherein if the fallback timer has reached a second specified timer threshold prior to a successful connection being established over the first and second network interfaces, then attempting a connection over the third network interface; and
using the first one of the first, second, and third network interfaces over which a connection is successfully established to communicate data.

17. The machine-readable medium as in claim 12 wherein the prioritization of the network interfaces is performed per-process wherein each network process is associated with a separate set of network interface prioritizations.

18. The machine-readable medium as in claim 12 wherein the second network interface will not be used if a particular process is designed to use only the first network interface.

19. The machine-readable medium as in claim 12 comprising additional program code to cause the machine to perform the operations of:
determining if the connection will be routed over a virtual private network (VPN); and
using the second network interface only if the connection is not to be routed over a VPN.

20. The machine-readable medium as in claim 12 comprising additional program code to cause the machine to perform the operations of:

determining if a process for which a connection is desired has a binding to a particular network interface other than the second user interface; and attempting to use the second network interface only if the process did not bind to the first network interface.

21. The machine-readable medium as in claim 12 wherein a successful connection is defined as the ability to access a desired resource.

22. A network client comprising a processor for processing program code to perform the operations of:

prioritizing two or more network interfaces, the two or more network interfaces including a first network interface and a second network interface;

initially attempting a connection over the first network interface, the first network interface having a relatively higher priority than the second network interface;

starting a fallback timer substantially concurrently with attempting the connection over the first network interface:

wherein if the fallback timer has reached a first specified timer threshold prior to a successful connection being established over the first network interface, then attempting a connection over the second network interface in parallel with the attempt to connect over the first network interface, wherein the attempting the connection over the first and second network interfaces includes attempting to establish a transmission control protocol (TCP) connection using the first and second network interfaces, respectively; and using the first one of the first and second network interfaces over which a connection is successfully established to communicate data.

23. The network client as in claim 22 comprising additional program code which, when executed, cause the operations of:

adjusting the specified timer threshold to a second specified timer threshold in response to connecting over the second network interface.

24. The network client as in claim 23 comprising additional program code which, when executed, cause the operations of:

re-adjusting the specified timer threshold back to the first specified timer threshold in response to connecting over the first network interface.

25. The network client as in claim 22 wherein the first network interface comprises a WiFi interface and the second network interface comprises a cellular interface.

26. The network client as in claim 22 wherein the two or more network interfaces include a third network interface, and wherein if the fallback timer has reached a second specified timer threshold prior to a successful connection being established over the first and second network interfaces, then attempting a connection over the third network interface; and using the first one of the first, second, and third network interfaces over which a connection is successfully established to communicate data.

* * * * *